United States Patent [19]
Pedersen

[11] Patent Number: 5,118,655
[45] Date of Patent: Jun. 2, 1992

[54] WATER CONTAMINANT ADSORPTION COMPOSITION

[75] Inventor: Paul M. Pedersen, Upper Marlboro, Md.

[73] Assignee: Western Water International, Inc., Forestville, Md.

[21] Appl. No.: 672,461

[22] Filed: Mar. 20, 1991

Related U.S. Application Data

[63] Continuation-in-part of Ser. No. 503,053, Apr. 2, 1990, abandoned, which is a continuation-in-part of Ser. No. 274,402, Nov. 21, 1988, abandoned.

[51] Int. Cl.$^5$ ............... B01J 20/14; B01J 20/20; B01D 15/04
[52] U.S. Cl. ............... 502/412; 210/679; 210/694; 502/413; 502/415; 502/417
[58] Field of Search ............... 502/412, 413, 415, 417, 502/407

[56] References Cited

U.S. PATENT DOCUMENTS

| | | | |
|---|---|---|---|
| 3,278,040 | 10/1966 | Goldberg et al. | 210/500 |
| 3,282,435 | 11/1966 | Goldberg et al. | 210/502.1 |
| 3,420,709 | 1/1969 | Barrett et al. | 127/53 |
| 3,545,622 | 12/1970 | Sakhnovsky et al. | 210/496 |
| 3,784,014 | 1/1974 | Turner | 210/263 |
| 4,238,334 | 12/1980 | Halbfoster | 210/679 |
| 4,280,913 | 7/1981 | Applegate | 210/669 |
| 4,789,475 | 12/1988 | Harte | 502/417 |
| 4,795,735 | 1/1989 | Liv et al. | 502/417 |
| 4,810,386 | 3/1989 | Copa et al. | 210/616 |

Primary Examiner—Paul E. Konopka
Attorney, Agent, or Firm—Michael J. McGreal

[57] ABSTRACT

A very effective adsorption composition has been produced for the removal of heavy metal ions, halocarbons, aromatic organics, radon and microbiological substances from water. This adsorption composition consists of up to 7 different components. These include aluminum silicate, diatomite, granulated activated carbon, catalytic chlorine removal media, tri-sodium phosphate, bone charcoal and activated alumina. This adsorption composition has a tri-disperse structure. By this it is meant it has three different types of pores. The adsorption composition is utilized by being packaged into cartridges, containers and alike where it is held in place while contaminated water passes through the adsorption composition and the contaminants are removed.

18 Claims, No Drawings

WATER CONTAMINANT ADSORPTION COMPOSITION

This application is a continuation in part of U.S. application Ser. No. 503,053 filed Apr. 2, 1990, now abandoned, which in turn is a continuation in part of U.S. application Ser. No. 274,402 filed Nov. 21, 1988, now abandoned.

BACKGROUND OF THE INVENTION

This invention relates to compositions which are specifically adapted for the purification of water. More particularly, the present invention is directed to water contaminant adsorption compositions which consist of a plurality of components and which are adapted for the removal of organic, inorganic and microbiological contaminants in water.

There is a growing concern amongst individuals and in industry with regard to the quality of the water that they are receiving. In many industries the water that is needed for certain processes must be of a very high quality. This is the case in such industries as medical laboratories, analytical laboratories and in the production of high quality electronic components. However, as this need for higher quality water is increasing there is a continual deterioration in the quality of the water that is available in many water supplies. This has become essentially a nationwide problem.

There is also considerable concern amongst individuals with regard to the water that they are receiving in their homes for consumption. This is also a concern in office and other commercial buildings. Many water utilities draw their water supplies from lakes and rivers into which various substances, including pollutants, are being flowed. It is true that these various pollutants will get diluted down to what is considered a safe level, but there is a concern today with regard to what exactly is a safe level for any particular contaminant in a water supply. There is also the problem that water will pickup metal contaminants from the piping distribution system. This includes lead and other heavy metals. In all honesty there is no hard data with regard to a safe amount of any contaminant that can be consumed. As a result there has been an increased usage of bottled water by many people for drinking water purposes and there has been the incorporation of water conditioning devices in home plumbing systems in order to assure a purified source of drinking water.

The present invention is directed to providing purified water for both industrial usages, commercial usages and for home usages. The objective is to remove by adsorption, or to remove catalytically, various elements and compounds, algae and bacteria, turbidity resulting from suspended matter, products of decayed vegetation, chemical waste, organic pesticides, sediment, metals including heavy metals, rust and silt from a water that is being received either from a well source or from a city water source. The present adsorbent compositions are able to handle contaminants at a high concentration levels. The present contaminant adsorption composition can adsorb over 97 percent of the organics contained in a water supply and can also remove more than 80 percent of the lead or other heavy metal that is contained in that water supply. In addition the adsorption composition will remove over 99.9 percent of elemental chlorine that is in the water supply.

The listing of the various contaminants that can be removed from a water source is quite lengthy. Needless to say it includes all of the major contaminant metals such as arsenic and lead, the various halocarbons which includes the various chlorocarbons and other halocarbons as well as the various aromatic organic substances such as benzene, toluene, styrene and ethyl benzene. The scope of the removal of such substances is to such an extent and to such a degree that there results a very high purified water which exits from the present adsorbent compositions.

Adsorption is not a new technique for removing various contaminants from water. Various fine solid materials have been utilized in the treatment of water. These have been utilized to remove fine solids from water and to remove discoloration from water. Such materials that have been used include various clays as well as activated carbons. In this regard in U.S. Pat. No. 3,278,040 there is disclosed a particular attapulgite clay filter aid product. This improved attapulgite clay with a flux mixture of alkali metal polyphosphate, and in particular sodium polyphosphate, sodium hydroxide, and lime. In the formation of this improved attapulgite clay filter aid the alkali metal polyphosphate and the sodium hydroxide are incorporated with the clay the with the clay then being in the form of a dilute aqueous colloidal suspension. The lime is then incorporated into the clay and the aqueous dispersion is dried to a solid condition. After being dried the composition is calcined at a high temperature. The result is an improved filter aid which can be used in various chemical processes.

In U.S. Pat. No. 3,420,709 there is disclosed a method for purifying a liquid which consists of contacting the liquid with an insoluble synthetic resin, such as an ion-exchange resin, and then contacting the liquid with an adsorbent such as activated carbon. In this patent there is disclosed a two step technique for liquid purification. The objective of this patent is to provide a system that is capable of purifying water and other liquids. In particular the process is directed to the purification of substances that are to be used as foods. In a preferred embodiment the disclosed invention contains as the principal adsorbent an activated carbon and as the complementary adsorbent an ion-exchange resin. The ion-exchange resin can be a cationic or an anionic ion-exchange resin. The disclosure of this patent is interesting, however there is set forth a fairly complex technique for purifying water and other liquids.

In U.S. Pat. No. 3,545,622 there is disclosed a permeable filter and drier block which consists of a silica gel and other inorganic desiccants, such as sodium aluminum silicate bound together into a self-supporting block. The silica gel and other inorganic desiccant are bound together into the block by means of an organic binder such as an epoxy resin or a polyvinyl alcohol resin. These compositions are primarily used as drying agents in systems such as refrigeration systems. However, they will also remove various other substances than water.

U.S. Pat. No. 3,784,014 discloses a waste and water treatment system. As a part of the waste and water treatment system there is a plurality of filtration columns. The filtration columns include a bimetallic medium which separates particles electrophoretically. That is, the filtration columns will contain substances such as electrically conductive metallic aluminum powder and electrically conductive carbon granules. The number of adsorption columns in the system will depend on the size of the system. However in general the system will include three different columns. The first column will contain aluminum powder which has a 20 to 50 mesh. In this column various suspended materials are coagulated and removed. The liquid then goes to a second stripper column. The stripper column will contain a mixture of aluminum powder and granular carbon. This column is in the nature of a galvanic cell. This column removes various ions remaining in the solution. The liquid then flows to a third column which contains activated carbon. The activated carbon has the capability of removing high amounts of chemical oxygen demand and biological oxygen demand by adsorption. This is an interesting and quite complex system for the purification of water.

In U.S. Pat. No. 4,238,334 there is disclosed a method of various materials for the purification of liquids. The active particulate material that is utilized as the adsorbing material can be an organic polymeric adsorbent, zeolites, bentonite, zirconium oxide, zirconium phosphate, activated alumina, activated carbon or diatomaceous earth. This adsorbent material will also contain a fibrous filter aid substance. The fibrous filter aid substance will have been treated with an electrolytic type of compound that produces a surface charge opposite to the normal charge of such a material. This filter bed is particularly adapted for the removal of suspended solid particles in a water supply.

The prior art is replete with various methods and techniques for the removal of various methods and techniques for the removal of various contaminants from water. Those discussed above relate to various adsorption techniques, Another technique that is utilized is aeration. In aeration a gas such as air is bubbled up through a supply of water and displaces various adsorbed organic and other substances in the water. These displaced substances exit into the atmosphere now having been displaced by air.

However, regardless of these various systems the present adsorbents are a considerable improvement over that which has been utilized in the art. As noted above they will remove over 97 percent of the halocarbon content of a water supply. They will also remove various metal ions including heavy metal ions. In a addition they will remove radon and will be effective in the removal of various microbiological substances. On a weight of contaminant adsorption basis the present adsorption compositions and systems are highly effective. Since they have a high rate of adsorption they can be utilized to process a large volume of water prior to having to be replaced.

BRIEF SUMMARY OF THE INVENTION

The present invention in one embodiment is directed to particular adsorption compositions for the purification of water. Water, whether it is received from a city supply or from a well will contain various contaminants. These will range from heavy metals, to halocarbons, aromatic organics, and various microbiological substances. It is highly desirable when such water is to be used for consumption purposes that the water first be processed to remove these various substances. It has been found that particular adsorption compositions are very effective for removing such substances from a source of water. These adsorbent compositions consist of aluminum silicate, kieselguhr, granulated activated carbon, optionally catalytic chlorine removal media and tri-sodium phosphate. These substances are formulated into a single filtration cartridges and/or bed. The aluminum silicate concentration of the composition will range from about 10 percent by weight to about 20 percent by weight. The kieselguhr (diatomite) concentration will range from about 5 percent by weight to about 15 percent by weight. The granulated activated carbon content will range from about 55 percent by weight to about 85 percent by weight. The catalytic chlorine removal media will range from about 0 percent by weight to about 7 percent by weight. The tri-sodium phosphate will range from about 0.1 percent by weight to about 0.4 percent by weight.

The highest content component of the adsorption compound consists of the granulated activated carbon. The granulated activated carbon consists of a highly active carbon having a minimum iodine number of 1050. This activated carbon is predominantly composed of a bituminous coal base and is of a U.S. mesh size of about 20 to 50 which as been rinsed using the various mineral acids. The refined mineral acids that can be used include phosphoric acid and sulfuric acid. In the formation of the adsorption compositions the aluminum silicate, kieselguhr, catalytic chlorine removal media, tri-sodium phosphate and up to about 4/5 (i.e. about 80%) of the granulated activated carbon are mixed to form a fine blend. After a fine blend is formed the remaining amount of granulated activated carbon is added and blending is continued for a short period of time. The end result is a homogeneous mixture of the adsorbent composition, but one in which there are two types of carbon. One has been thoroughly mixed with all components and the other substantially retains its original identity. The fully mixed adsorbent composition is then utilized in cartridges or other devices for purification of water.

In a second embodiment of the invention the above compositions can contain bone charcoal. The bone charcoal can be added as a component of the main portion of the compositions. The bone charcoal assists in the removal of heavy metals. It is also an embodiment to have some bone charcoal as a part of the remaining amount of granulated activated charcoal which is mixed into the main portion after the main portion has been fully mixed. It is a preferred embodiment to have the bone charcoal used as a separate layer in conjunction with a layer of the adsorption compositions of the first embodiment.

In yet a further third embodiment the compositions of the second embodiment can contain activated alumina. Activated alumina is effective in removing various organics and biological materials, The activated alumina can be mixed along with the bone charcoal into the first embodiment adsorption compositions. When a separate layer of bone charcoal is used then the activated alumina can be a part of this layer. It is preferred that the activated alumina be a separate layer followed by the bone charcoal.

DETAILED DESCRIPTION OF THE INVENTION

It has been discussed above that there is a continual need for adsorbent compositions for the removal of various contaminants from water. This is particularly the case at the present time as more chemicals show up in both city water systems and in well water systems. Regardless of how these substances got into the water supply system they must be removed before the water can be safely consumed.

There are many techniques for the purification of water. However, in order for a technique to be effective it must be able to handle large volumes of water and to reduce the contaminant levels in large volumes of water. In the present instance the present adsorbent composition is capable of removing large quantities of halocarbons, aromatic organics, and heavy metals from a water supply prior to requiring replacement. It is this ability of the present adsorbent composition to handle such large volumes of water that makes it so effective. In a first embodiment the present adsorbents are comprised of particular components, and such components are present in a particular concentration range. The particular components consist of aluminum silicate, kieselguhr which is also known as diatomite, granulated activated carbon, optionally a catalytic chlorine removal media and tri-sodium phosphate. The aluminum silicate filter media is present in an amount from about 10 to about 30 percent by weight. The diatomite is present in an amount from about 5 to 15 percent by weight. The granulated activated carbon is present in an amount from about 25 percent by weight to about 85 percent by weight. The catalytic chlorine removal media is present in an amount of about 0 to about 7 percent by weight. The tri-sodium phosphate is present in an amount of about 1 percent by weight to about 4 percent by weight. Each of these components is present in a particular particle size range. The aluminum silicate is present in a particle size range of from about 80 microns to about 400 microns. The diatomite is present in a particle size of from about 40 microns to about 120 microns. The granulated activated carbon is present in a particle size range of from about 20 to 50 mesh. The catalytic chlorine removal media is present in a particle size range of from about 150 microns to about 400 microns. The tri-sodium phosphate is present in a particle size range of from about 30 microns to about 80 microns.

The components of this adsorbent composition are all commercially available. The granulated activated carbon is composed primarily of a bituminous coal based material having a U.S. mesh size of about 20 to 50. This coal based material undergoes acid rinses, such as rinses with phosphoric acid and/or sulfuric acid. This increases the porosity of the carbon of the bituminous coal base and also increases its adsorption activity. In addition the iodine number of this granulated activated coal is at least about 1050. The preferred activated carbon is available as Carbon 250 from the Ceca Division of the Atochem Company.

The preferred aluminosilicate component is a non-hydrous aluminosilicate, and is available from the Clack Company of Windsor, Wis. under the name of Filter AG.

In the formation of the adsorbent composition the aluminum silicate, diatomite, about 4/5 (i.e. about 80%) of the granulated activated carbon, the catalytic chlorine removal media, and the tri-sodium phosphate are blended to from a homogeneous mix. A suitable mixer is a twin shell blender. The mixing takes from about 25 to about 45 minutes. At the end of this mixing time the remaining about ⅕ of the granulated activated carbon is added and the mixing is continued for about 3 to 10 minutes. At the end of this period of time the adsorption composition is in the form of a homogeneous mixture. Interestingly, there also results a modification of the original electrical charge on the granulated activated carbon. This modified charge results in a greater spectrum of organic substance removal.

The granulated activated carbon is added in two steps in order to enhance the ability of the adsorption compound to remove chlorine containing substances. As pointed out above the granulated activated carbon has been modified to a degree during the mixing procedure. It is the granulated activated carbon that was present throughout the mixing process that has undergone the greatest degree of change. Although this degree of change assists in the overall performance of the adsorption compound it does result in a decrease of the ability of the granulated activated carbon to adsorb chlorine containing compounds. Consequently, the later added granulated activated carbon is mixed for a shorter period of time and undergoes a much decreased degree of modification. In this regard later added granulated activated carbon will be very active in the adsorption of chlorine containing compounds.

As an alternative, the catalytic chlorine removal media also can be added as a separate layer in order to improve the ability of the adsorption composition to remove chlorine compounds. It can also be in the blends and as a separate layer. A preferred catalytic chlorine removal media is KDF available from ORC, Inc. of Constantine, Mich. This is a zinc and copper mixture which is in a particulate form. The metal reacts with chlorine to remove the chlorine from the water. However, in most instances the granulated activated carbon will be added in two batches and the catalytic chlorine removal media will also be utilized, although sometimes in a decreased amount. This has been found to be a good way to remove chlorine and chlorine compounds.

In a second embodiment the adsorbent composition can also contain bone charcoal. Bone charcoal is very effective in removing heavy metals from a water stream. This includes lead, cadmium, zinc, aluminum, iron, manganese and mercury. Bone Charcoal is an effective adsorbent since it contains an active carbon surface and a hydroxyapatite lattice both of which are porous and adsorptive. When a part of the composition of the above first embodiment the bone charcoal will comprise about 5 to 25 percent by weight of the composition to which it is added, and preferably about 10 to 20 percent by weight. In forming the composition it can be mixed into the composition along with the first portion of the granulated activated carbon. It is also an embodiment where the bone charcoal can be a part of the later added portion of granulated activated carbon.

As a part of this second embodiment where bone charcoal is a component, the bone charcoal is preferably present as a separate and distinct layer from the first embodiment composition in an amount depending on the degree of contamination. In this case the compositions will essentially operate separately in removing contaminants from water.

In a third embodiment the second embodiment composition can also contain as a component activated alumina. The activated alumina can be added along with the bone charcoal or as a apearate layer. As a separate layer it would be located prior to the bone charcoal layer. Activated alumina is an effective adsorbent for removing various organics. However, since there is a tendency of activated alumina to give up some aluminum ions it should be used in conjunction with bone charcoal. Bone charcoal is effective in removing aluminum in small amounts. When a part of the composition activated alumina will be present in an amount of about 25 to 125 percent by weight of the bone charcoal content. This is the case whether the bone charcoal is a part of the main adsorbent composition or if it is present as a separate layer.

The bone charcoal is present in a particle size range of about 20 to 50 mesh. The activated alumina is available in a particle size of about 50 to 100 mesh. In this way the bone charcoal and activated alumina can be readily mixed into the primary adsorption composition. A preferred bone charcoal is Brimac 216 available from British Charcoals & MacDonalds of Greenocks, Scotland. Useful activated aluminas are those available from Kaiser Chemicals as activated aluminas F-1, A-201 and A-202.

After the particular composition has been formulated it is than ready for usage. In usage it is packaged into various cartridges, housings, containers and the like for utilization. Since the adsorption composition is in the form of a powdery like material it must be contained within some sort of a housing for usage. This is the case since the adsorption compound has a high adsorptivity for a wide range of water contaminants. A small amount of this adsorption composition will remove a large amount of contaminant. This then permits for a large throughput of water through a cartridge or other device which contains the adsorbent composition. It is this property of high adsorptivity that makes this adsorbent composition very effective for utilization in smaller water use systems. However, this composition can be effectively used to treat large municipal water supply systems and could be used in place of various other adsorbents that are currently being utilized.

As has been noted when bone charcoal and optionally activated alumina are present the bone charcoal or bone charcoal and activated alumina mixture can be present in separate layers. In such an instance the cannisters, cartridges or other holder would be designed to accommodate such a structure. Further the amounts of each layer would be adjusted in order to fit the particular needs. That is, the cannister or cartridge would be designed for the optimum removal of contaminants.

The primary adsorption composition is of a structure which in known as a tri-disperse structure. By tri-disperse structure it is meant that the adsorption composition has a triple range of pore size. The pore sizes of the the micropores range from about 15 angstroms to about 25 angstroms. The pore size of the transitional pores range from more than 25 angstroms of to about 400 angstroms. The size of the macropores range from more than about 400 angstroms up to about 30,000 angstroms. The micropores account for about 90 percent of the total surface area of the adsorption compound. However, even though the micropores account for the largest amount of the surface area the other pores are also quite important with regard to the adsorption characteristics of this composition.

This adsorption composition will now be further described with reference to the following examples.

EXAMPLE 1

This example describes how to make the present adsorbent composition.

Into a twin shell blender add 4.8 pounds of the Activated Carbon 250 available from Ceca Division of the Atochem Company, 2 pounds of Filter AG aluminosilicate, 1 pound of diatomite, and 0.2 pounds of tri-sodium phosphate. Blend these ingredients for a period of 35 minutes. Then add an additional 2.0 pounds of the activated carbon and continue blending for 7 minutes. This mixed adsorbent composition is then place in cartridges.

EXAMPLE 2

One hundred ninety nine grams of the composition of Example 3 were placed in a cylinder having a 5 inch diameter and a 6 inch length. City tap water having a chlorine content of 3.02 mg/liter is flowed through this filter. The exit water which flows from the filter has 0% chlorine. All of the chlorine has been removed.

EXAMPLE 3

A known lead containing solution was formed containing 184 milligrams of lead per liter. This solution was passed through a filter cartridge containing 199 grams of the adsorbent composition of Example 1. The cartridge is 5 inches in diameter and 6 inches in length. The filtrate, after having passed through the filter, contained 12 mg./liter of lead. This is a reduction of 93.48% in the lead content of the water.

EXAMPLE 4

This example provides a comparison of the use or the basic adsorbent composition exemplified in Example 1, the basic adsorbent composition plus bone charcoal, the basic adsorbent composition plus bone charcoal plus activated alumina and with bone charcoal alone. It is seen that an adsorbent that contains the basic adsorbent composition alone and in combination with bone charcoal and/or activated alumina provides for an enhanced adsorption of lead.

| ADSORBENT | LEAD BEFORE TREATMENT* | LEAD AFTER TREATMENT* |
|---|---|---|
| Bone Charcoal | 42.5 | 14.0 |
| Bone Charcoal | 41.2 | 19.0 |
| Basic Adsorbent Plus Bone Charcoal | 49.6 | 9.4 |
| Basic Adsorbent Plus Bone Charcoal | 16.0 | ND |
| Basic Adsorbent Plus Bone Charcoal Plus Activated Alumina | 91.2 | 9.8 |
| Basic Adsorbent Plus Bone Charcoal Plus Activated Alumina | 18.7 | ND |
| Basic Adsorbent Plus Bone Charcoal Plus Activated Alumina | 22.5 | ND |
| Basic Adsorbent Plus Bone Charcoal Plus Activated Alumina | 18.8 | ND |
| Basic Adsorbent Plus Bone Charcoal Plus Activated Alumina | 55.6 | ND |
| Basic Adsorbent Plus Bone Charcoal Plus Activated Alumina | 24.7 | ND |

*Lead content is in parts per billion
ND = Not Detectable

The present adsorbents have a higher degree of lead adsorption than bone charcoal alone which is known for it utility in adsorbing lead and other heavy metals.

What is claimed is:

1. An adsorbent composition of a first granulated active carbon and a second granulated active carbon for water purification comprising as a primary component a comixture comprising said first granulated active carbon, diatomite and aluminum silicate and as a second component said second granulated active carbon which is blended into said primary component whereby the active carbon of said second component has a higher adsorbtivity for chlorine than the active carbon of said primary component and wherein said granulated active carbon of said primary component comprises up to about 4/5 of the granulated carbon of said adsorbent composition and the total granulated carbon content comprises from about 25 percent by weight to about 85 percent by weight of said adsorbent composition.

2. An adsorbent composition as in claim 1 which contains from about 1 percent by weight to about 4 percent by weight tri-sodium phosphate.

3. An adsorbent composition as in claim 1 which contains from about 0 percent by weight to about 7 percent by weight of a catalytic chlorine removal agent comprising at least one metal in particulate form.

4. An adsorbent composition as in claim 1 which contains from about 5 percent by weight to about 15 percent by weight of diatomite and from about about 10 percent by weight to 30 percent by weight of aluminum silicate.

5. An adsorbent composition as in claim 4 which contains from about 1 percent by weight to about 4 percent by weight of tri-sodium phosphate.

6. An adsorbent composition as in claim 1 wherein said granulated active carbon has pores which range in the size from about 15 angstroms to about 30,000 angstroms.

7. An adsorbent composition as in claim 1 wherein said primary component contains bone charcoal.

8. An adsorbent composition as in claim 7 wherein said primary component contains activated alumina.

9. An adsorbent composition as in claim 8 wherein said bone charcoal comprises about 5 to 25 percent by weight of the primary component and said activated alumina is present in an amount of about 2 to 25 percent by weight of the bone charcoal.

10. An adsorbent composition as in claim 1 wherein there is a separate layer of bone charcoal.

11. An adsorbent composition as in claim 10 wherein there is a separate layer of activated alumina.

12. A method of making an adsorbent composition for purifying a contaminated water comprising forming a homogeneous admixture of aluminium silicate, diatomite and a major amount of a granulated active carbon that is to be added, mixing such components for a first period of time and then in a second step adding the remainder of the granulated active carbon and mixing said components for a second period of time, but a shorter period of time than the first period of time.

13. A method as in claim 12 wherein a tri-sodium phosphate is added along with the initial components.

14. A method as in claim 12 wherein a catalytic chlorine removal media comprising at least one metal in particulate form is added along with the initial components.

15. A method as in claim 12 wherein said initial components are mixed for about 25 to 45 minutes and the remainder of the granulated active carbon is mixed for about 3 to 10 minutes.

16. A method as in claim 12 wherein bone charcoal is added as a component of said homogeneous mixture.

17. A method as in claim 16 wherein activated alumina is added as a component of said homogeneous mixture.

18. A method as in claim 16 wherein the remainder of the granulated active carbon contains bone charcoal.

* * * * *